Figure 1:
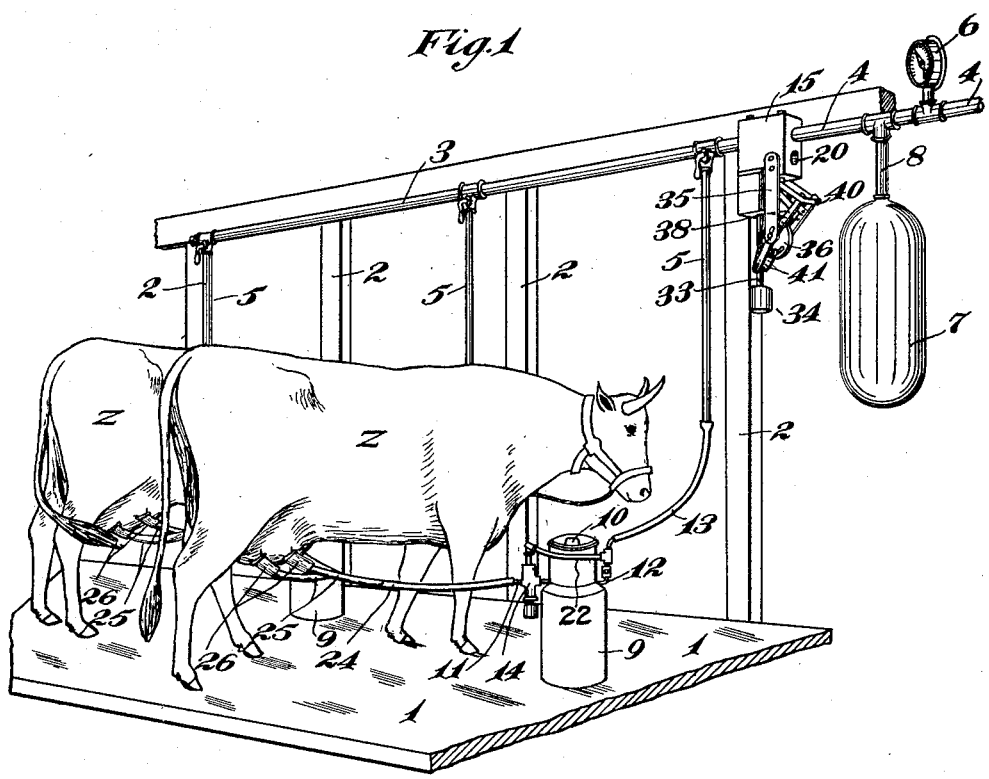

E. E. GOOD.
PULSATING DEVICE FOR MILKING APPARATUS.
APPLICATION FILED SEPT. 3, 1908. RENEWED APR. 10, 1911.

1,007,865.

Patented Nov. 7, 1911.

2 SHEETS—SHEET 1.

E. E. GOOD.
PULSATING DEVICE FOR MILKING APPARATUS.
APPLICATION FILED SEPT. 3, 1908. RENEWED APR. 10, 1911.
1,007,865.
Patented Nov. 7, 1911.
2 SHEETS—SHEET 2.
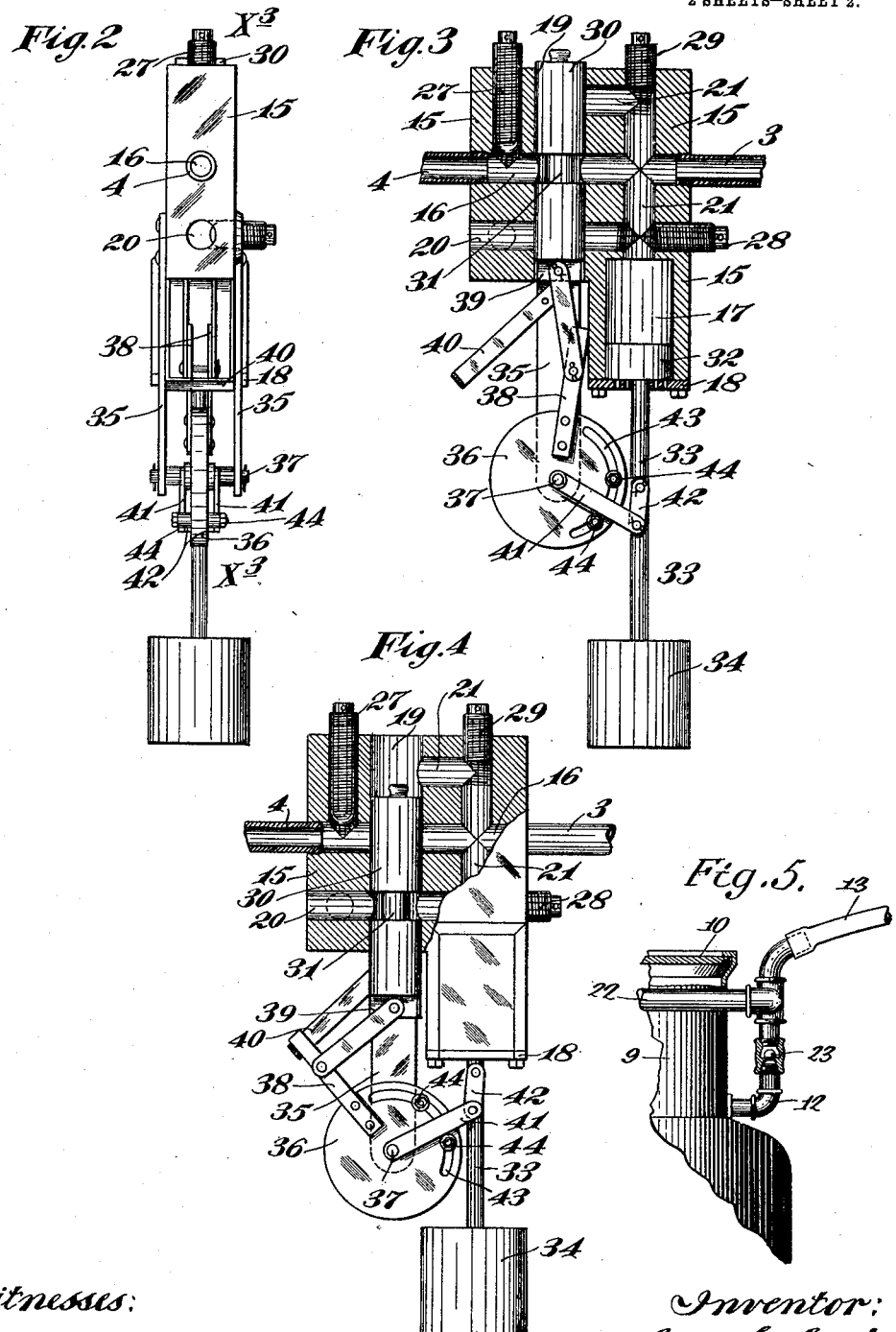
Witnesses:
W. H. Souba
Harry Opsahl
Inventor:
Ezra E. Good.
By his Attorneys:
Williamson & Hudson

UNITED STATES PATENT OFFICE.

EZRA E. GOOD, OF WATERLOO, IOWA.

PULSATING DEVICE FOR MILKING APPARATUS.

1,007,865. Specification of Letters Patent. Patented Nov. 7, 1911.

Application filed September 3, 1908, Serial No. 451,492. Renewed April 10, 1911. Serial No. 620,022.

*To all whom it may concern:*

Be it known that I, EZRA E. GOOD, a citizen of the United States, residing at Waterloo, in the county of Blackhawk and State of Iowa, have invented certain new and useful Improvements in Pulsating Devices for Milking Apparatus; and I do hereby declare the following to be a full, clear, and exact description of the invention, such as will enable others skilled in the art to which it appertains to make and use the same.

My invention relates to cow milking apparatus and is particularly directed to the provision of an improved pulsator or mechanism for producing pulsations or variations in pressure in the service pipes and tubes of the apparatus.

To the above ends, the invention consists of the novel devices and combinations of devices hereinafter described and defined in the claims.

In milking apparatus, it has hitherto been customary to employ automatic pulsators, but so far as I am aware, they have always been so arranged that when the air vent controlled thereby is opened up, air will be admitted, not only into the service pipes and tubes, but also into the entire pipe system, so that the vacuum is thereby reduced, at each pulsation, completely to the vacuum pump or device used to produce the partial vacuum or suction within the pipes of the system. This has been found to be wasteful of energy and to make slow or logy the milk drawing or pumping action of the apparatus.

In my present improved pulsator, the arrangement is such that air admitted by opening of the vent will not be admitted into the pump pipe proper, but will be admitted only into the service pipe and branches or tubes connected thereto. With this arrangement therefore, the vacuum produced in the pump pipe or on the pump side of the pulsator will not be reduced by opening of the air vent, and the air will be admitted only into the service pipe and its branches, where such action is required to produce the effective pulsations, necessary to draw the milk from the teat cups into the milk cans. This, as is obvious, results in a great saving in energy, by maintaining the vacuum in the pump pipe, so that it will be immediately active to produce the required suction, in the service pipe, when the air vent is again closed and communication is again established between the pump pipe and the service pipe.

In the accompanying drawings which illustrate the improved pulsator operatively applied in a milking apparatus, like characters indicate like parts throughout the several views.

Referring to the drawings: Figure 1 is a perspective view showing the invention applied as indicated. Fig. 2 is a side elevation showing the improved pulsator removed from working position. Fig. 3 is a view partly in side elevation, but principally in vertical section on line $x^3$ $x^3$ of Fig. 2. Fig. 4 is a view corresponding in the line of its section to Fig. 3, but showing more of the parts in full than in Fig. 3, and also illustrating different positions of the movable parts of the plusator; and Fig. 5 is a detail view, partly in section, showing a portion of the can and air outlet pipe.

In Fig. 1, the numeral 1 indicates the floor and the numeral 2 stall posts rigidly secured in the usual or any suitable way.

The character $z$ indicates the cows within the stalls which are being milked by the apparatus.

The numerals 3 and 4 indicate what are herein designated as the service pipe and the pump pipe, the latter of which leads to a suitable air pump, and by means of which, the partial vacuum is produced in the various pipes and tubes of the milking apparatus. The service pipe 3 has valved branch pipes 5, of which branch pipes there is one for each stall.

The numeral 6 indicates a vacuum gage applied to the pump pipe 4, and the numeral 7 indicates a reservoir, which as shown, is connected to the pump pipe 4 by a short depending pipe 8.

The numeral 9 indicates milk cans provided with removable covers 10 of the usual or any suitable construction, which will make the cans approximately air tight when applied.

The highest efficiency is obtained by the use of this improved pulsator in connection with devices such as disclosed and claimed in my United States Letters Patent No. 937,789, issued of date October 26, 1909, entitled "Milking apparatus", which device is applied to the cans and serves to prevent air from entering the can when air is admitted into the service pipe of the system, by the opening of the air vent of the said pulsator. Of the parts of the said improved can attachment, it is only desirable for the purposes of this case, to note the air outlet or suction pipe 12, which extends from the can and is connected, as shown, by flexible tube 13 connected to the lower end of the coöperating branch pipe 5; the milk inlet tube 11, which extends into the can 9 through a valve controlled casing 14; and the by-passage 22 that connects the said casing 14 with the said suction pipe 12 of the said can attachment. The said pipe 12 between the can and the connected end of said by-pass 22 is provided with a gravity seated check valve 23 that freely opens under suction to permit air to be drawn from the can 9 but which closes automatically to prevent air from entering the can through the pipe 12.

The construction and the operation of the valve mechanism in the casing 14, need not be herein considered, it being sufficient to state that when the vacuum is increased in the service pipe 3 and in the branch pipes 5 and tubes 13, milk will be drawn into the can through the flexible milk tubes 24, their branches 25, and teat cups 26 applied to the ends of the said branches.

Considering now the construction of the improved pulsator, the numeral 15 indicates the casing thereof preferably as shown, in the form of the cast block having a transversely extended port 16, one extremity of which is connected to the service pipe 3, and the other extremity of which is connected to the pump pipe 4. In its lower depending portion, the casing 15 is provided with a piston seat 17, having, as shown, a detachable perforated head 18 at its lower end. At one side of the piston seat 17, the casing 15 is provided with a cylindrical valve seat 19 that extends vertically through the port 16 and, as shown, also through a lower air vent port 20 that leads from the atmosphere into a port 21, which in turn extends upward from the piston seat 17, through the port 16, and at its upper extremity, opens into the upper portion of the valve seat 19.

The numeral 27 indicates a screw in the casing 15 which serves to contract the port 16 on the pump side of the valve seat 19; the numeral 28 indicates the screw in said casing, which serves to contract the lower portion of the port 21; and the numeral 29 indicates another screw in said casing, which serves to contract the upper portion of said port 21. Said port 21, it will be noted, is connected to the service pipe 3, and hence, is on the service pipe side of the valve seat 19.

Working in the valve seat 19, is a plunger valve 30, having a reduced central portion that affords a port 31, which when said valve is raised as shown in Fig. 3, opens the port 16, while the body of the said valve closes the port 20 and the upper portion of port 21.

As a controller for the valve 31, I preferably employ a piston 32 that works in the piston seat 17, and hence, is subject to varying vacuum or pressure from within the service pipe of the apparatus. This piston 32 has a depending stem 33 that works downward through the head 18, and is provided with a weight 34.

To the casing 15 on each side of the valve seat 19, is secured a pair of laterally spaced depending metal straps or bars 35, to the lower ends of which a disk like oscillatory member 36 is pivoted by means of a pin 37. The lower member of a toggle 38 is secured to and carried by the disk 36, and the upper member of the said toggle is pivotally connected to a depending lug 39 of the valve 30. This toggle 38 is adapted to be moved from one side to the other of a dead center, and its movements are limited by engagement with the upwardly extended end of the lower toggle member with the depending portion of the casing 15, and with the stop yoke 40 secured to the bars 35.

A bifurcated toggle tripping lever 41 embraces the disk 36, is pivoted to one end of the pin 37, and at its other end, is connected to the piston stem 33 by links 42. The disk 36 is provided with a segmental slot 43 in which adjustable stops 44, shown as afforded by short bolts and washers, are adjustably secured. These stops 44 are adapted to be engaged with the lever 41, and they are preferably so set, that the said lever has a limited free movement between the same.

The normal position of the parts is shown in Fig. 3, and in this position of the parts, the air vent through the ports 20 and 21 is closed, and the pump pipe 4 is in communication with the service pipe 3 through the port 16 of the casing 15, and through the port 31 of the valve 30. The instant that the said port 16 is opened up by upward movement of the said valve 30, the vacuum or partial vacuum maintained in the pump pipe 4, will be effective to produce the suction in the service pipe, in the branches thereof, and in the milk tubes and teat cups, required to draw the milk into the cans. Also this suction will be sufficient to raise the weighted piston 32, and this upward movement of the piston operating through the lever 41, and disk 36, will move the toggle from the position shown in Fig. 3, to the other side of the dead center, whereupon the weight of the valve 30, will cause the said valve to move downward and buckle the toggle as shown in Fig. 4. The exact time in each pulsation, when the piston 32 will be moved upward and will cause the valve 30 to drop into the position shown in Fig. 4, may be regulated by adjustments of the screw 28, and it may also be varied by varying the weight 34. When the valve 30 is in the position shown in Fig. 4, it will be observed, it closes the port 16, thereby cutting off communication between the pump pipe 4 and the service pipe 3, and it opens the air vent through the ports 20 and 21. As soon as the air thus admitted into the service pipe sufficiently reduces the partial vacuum therein, the weighted piston 32 will drop back into its normal position and under such return movement, will operate through the lever 41 and disk 36, to carry the toggle 38 back into its normal position, shown in Fig. 3, and thereby again raise the said valve 30 into its normal position, in which position as before stated, the air vent is closed and communication is established between the pump pipe and the service pipe. In this way, the required pulsations or variations in pressure are produced in the service pipe and connections without depleting or bleeding the pump pipe, or those air connections that are on the pump side of the casing of the pulsator.

The reservoir 7 shown in Fig. 1, is an unnecessary part of my invention, and in many instances, will not be used. For milking systems where a very large number of cans are connected, this reservoir will however, be found serviceable, as the partial vacuum therein contained, augments the partial vacuum in the pump pipe and affords an auxiliary force serving to more quickly restore the required partial vacuum in the service pipe and milk tubes.

What I claim is:

1. In a milking apparatus, the combination with a pump pipe and a service pipe, of an automatic pulsating device connected between said pump pipe and said service pipe and operating intermittently to alternately connect said two pipes and to open said service pipe to the atmosphere, but at all times cutting off atmospheric air from said pump pipe, a multiplicity of milk cans, milk conduits leading into said cans, independent air conduits leading from said cans to said service pipe, and devices applied to said cans and serving to prevent air from entering the said cans, when air is admitted into said service pipe, by operations of said common pulsating device.

2. In a milking apparatus, a pulsator comprising a casing connected between the service and pump pipes of said apparatus, a controller subject to varying pressure from within said service pipe, an air vent leading into said service pipe, a valve normally closing said air vent and opening communication between said service and pump pipes, and a toggle-acting connection between said controller and said valve, arranged to move said valve into position to open said air vent and cut off communication between said service and pump pipes, when said controller is raised.

3. A pulsating device for a milking apparatus comprising a casing adapted for connection to one of the pipes of the apparatus, a controller in the form of a weighted piston, seated in said casing and adapted to be actuated by varying vacuum, or pressure from within the apparatus, an air vent leading to the piston end of said controller, a valve normally closing said air vent, a toggle movable from one side to the other of a dead center, to set said valve in two positions, and a connection from said controller operating to move said toggle from one side to the other of a dead center.

4. In a milking apparatus, a pulsator comprising a casing, connected between the service and pump pipes of said apparatus, said casing having a piston seat communicating with said service pipe and provided with an air vent leading to said piston seat and hence to said service pipe, a controller in the form of a weighted piston working in said piston seat, a valve normally closing said air vent and opening communication between said service and pump pipes, a toggle movable from one side to the other of a dead center, to set said valve in its two positions, and in one of which positions the said valve opens said air vent and cuts off communication between said service and pump pipes, an oscillatory member carrying one of the toggle members and an arm connected to said controller and operative on said oscillatory member, but having a limited movement in respect thereto.

In testimony whereof I affix my signature in presence of two witnesses.

EZRA E. GOOD.

Witnesses:
 IRA RODAMAR,
 J. E. SIDYWITZ.